Sept. 26, 1950 A. W. HAYDON 2,523,298
MOTOR SPEED GOVERNOR
Filed Feb. 11, 1948 4 Sheets-Sheet 1

INVENTOR
Arthur W. Haydon
BY
Pennie Edmonds Morton & Barrows
ATTORNEYS

Sept. 26, 1950  A. W. HAYDON  2,523,298
MOTOR SPEED GOVERNOR
Filed Feb. 11, 1948  4 Sheets-Sheet 2
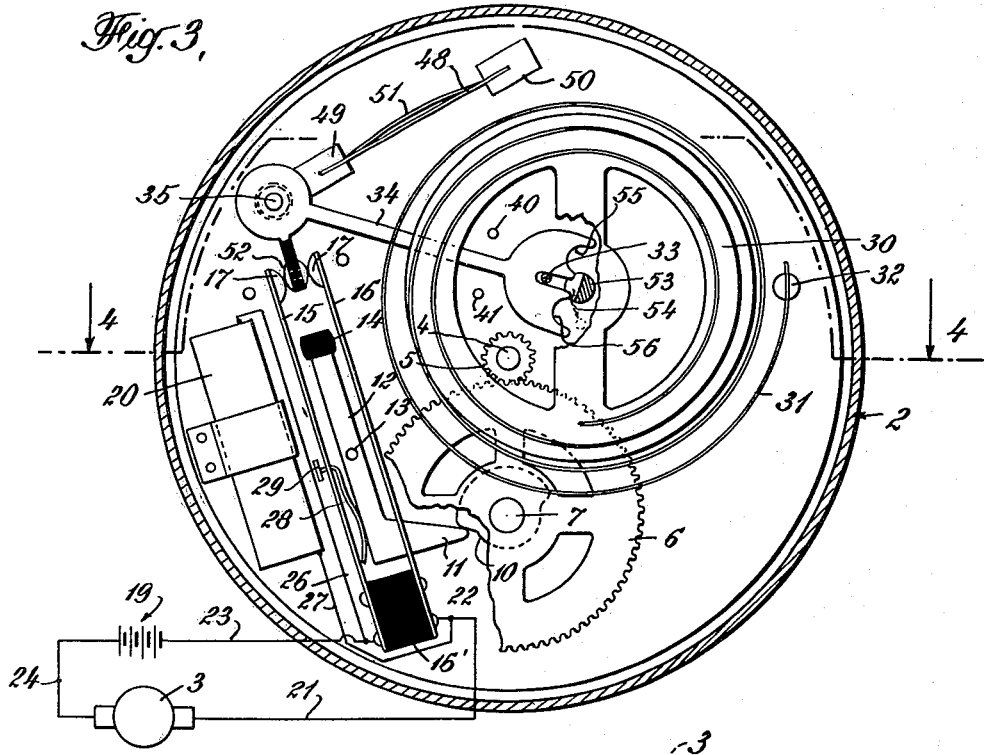
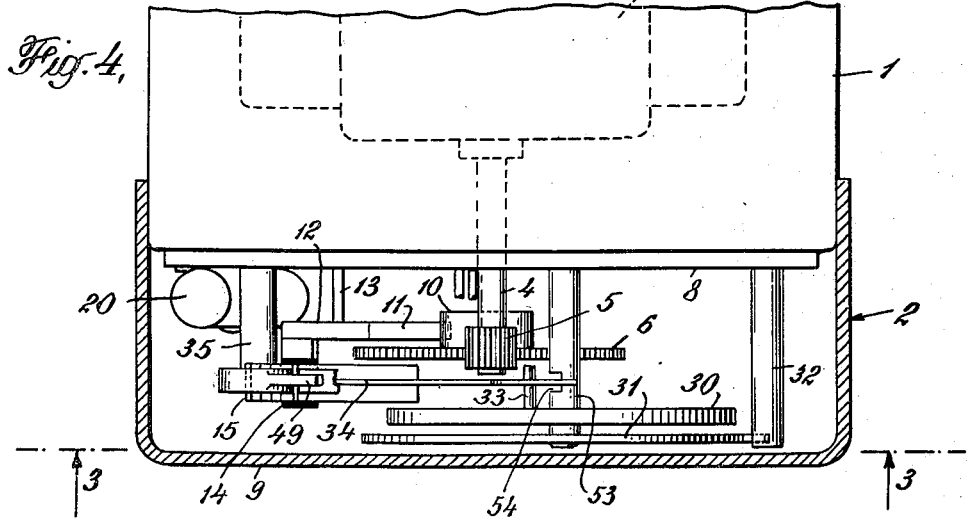
INVENTOR
Arthur W. Haydon
BY
ATTORNEYS Sept. 26, 1950  A. W. HAYDON  2,523,298
MOTOR SPEED GOVERNOR
Filed Feb. 11, 1948  4 Sheets-Sheet 3
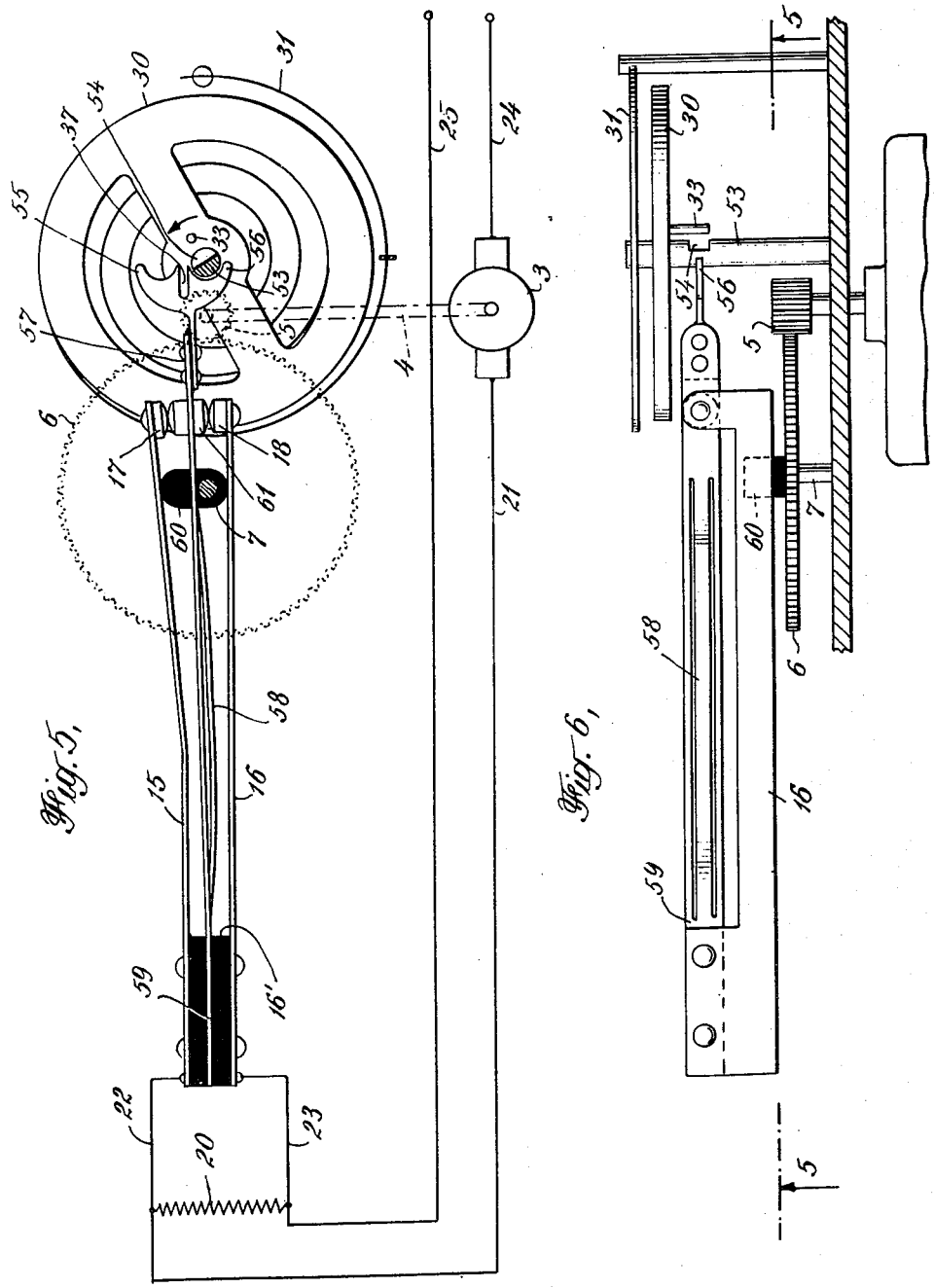

Sept. 26, 1950  A. W. HAYDON  2,523,298
MOTOR SPEED GOVERNOR
Filed Feb. 11, 1948  4 Sheets-Sheet 4
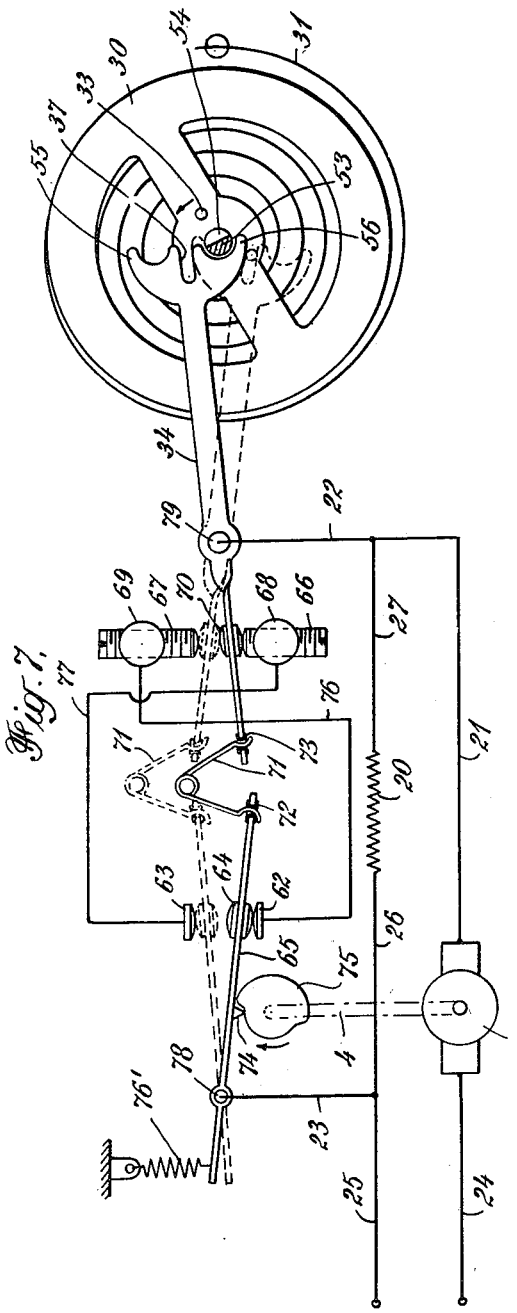
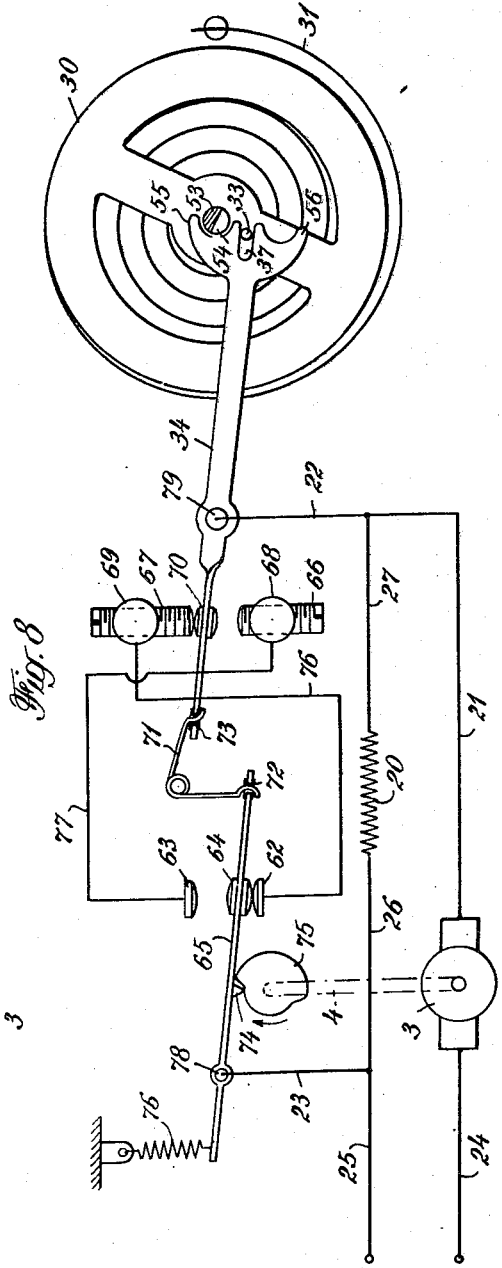
INVENTOR
Arthur W. Haydon
BY
Pennie Edmonds Morton & Barrows
ATTORNEYS Patented Sept. 26, 1950

2,523,298

UNITED STATES PATENT OFFICE 2,523,298

MOTOR SPEED GOVERNOR

Arthur W. Haydon, Marion, Conn.

Application February 11, 1948, Serial No. 7,691

27 Claims. (Cl. 318—311)

This invention relates to speed governor for variable speed electric motors, i. e., motors which have a tendency to operate at a speed that varies as the load on the motor changes or as the terminal voltage of the motor fluctuates.

The principal object of this invention is to provide an improved motor governor capable of causing a variable speed motor to operate at a constant average speed regardless of changes in the load on the motor or other variations in operating conditions which tend to change the motor speed.

A further object of this invention is to provide an improved governor employing a constant speed controlling device for causing a motor current supply circuit to close at fixed regular intervals, regardless of the instantaneous speed of the motor, while the motor operates near the desired predetermined average speed, this circuit being then opened by motor driven means at instants determined entirely by the travel of the motor. The current supplied to the motor by this circuit is sufficient to tend to cause the motor to accelerate to a speed above the desired predetermined value, and, during normal operation of the motor, current is intermittently supplied thereto by this circuit for intervals of time the duration of which is commensurate with the motor load, if the terminal voltage remains constant, or commensurate with the motor voltage if the load remains constant. In other words, the lower the instantaneous speed of the motor, the longer the period of supplying current to the motor through this circuit. During normal operation of the motor the supply of current to the motor from this control circuit is interrupted by action of a motor driven element at instants determined by the travel of the motor. Thus, when the motor operates near a desired predetermined speed, the circuit contacts are opened each time this motor driven element reaches a certain position and the time required for this position to be reached depends upon the instantaneous speed of the motor under the load and terminal voltage conditions then obtaining.

According to a preferred embodiment of the invention, the constant speed device derives all of its energy from the motor, this energy being delivered indirectly through energy storing means which stores the required energy during certain periods and delivers it to the constant speed device only at other periods so that the instantaneous speed of the motor at the time this energy is delivered cannot affect the magnitude of the energy impulses transmitted to this device.

A single energy storing means may be employed for this purpose but I prefer to employ two such energy storing elements arranged so that they are alternately energized by the motor and alternately discharge energy impulses of constant magnitude to the constant speed device.

Where two separate energy storing elements are employed, I prefer to provide means for selectively disconnecting them from the motor after they are energized and for then causing them to release energy impulses to the constant speed device while so disconnected from the motor. This insures the delivery of uniform energy impulses to the constant speed device regardless of the load on the motor at the time such impulses are delivered, thus providing constant speed operation of this device. The energy storing element or elements may be connected to switch contacts in the motor control circuit so that the action of the motor at speeds near the desired predetermined value to energize these elements may also actuate the switch contacts to open the control circuit, and so that the action of these elements to deliver energy impulses to a constant speed device may also serve to close the control circuit. The constant speed device may regulate the action of the energy storing element or elements to provide the desired energy holding or storing function, and the release of the energy to the constant speed device at constant fixed intervals entirely independent of the instantaneous speed of the motor as it operates at speeds near the desired predetermined average value.

A typical embodiment of my invention comprises a constant speed device in the form of a hair spring balance wheel carrying an impulse pin cooperating with a notched lever to regulate the action of the energy storing element or elements and to cause the control circuit contacts to close at fixed regular intervals, depending upon the adjustment of the balance wheel.

It has been proposed heretofore to provide a motor governor comprising a spring escapement or the like deriving its energy from the governed motor. In these prior constructions the magnitude of the energy impulses imparted to the escapement varies with changes in the motor load and with other conditions affecting the instantaneous speed of the motor. Such devices have been defective because if the escapement is of such a nature that it maintains a constant rate of oscillation under these conditions, it is not reliably self starting. On the other hand, if the escapement is such as to insure reliable starting, its period of oscillation changes with the motor speed. In a speed governor embodying my invention, however, the constant speed device may derive its energy from the governor motor in a manner such that the magnitude of the energy impulses imparted to the constant speed device is constant regardless of the variations in the instantaneous speed of the motor, while the motor operates near the desired predetermined speed.

A typical embodiment of my invention may comprise a variable speed motor, a balance wheel constant speed device having a natural period of oscillation depending upon the adjustment of the balance wheel spring, and an electric circuit for supplying sufficient energy to the motor to tend to cause the motor to operate at a speed above the desired predetermined value. Switch contacts are provided in this electric circuit and the motor drives a cam or the like which opens these switch contacts at intervals commensurate with the travel of the motor, i. e. some predetermined fraction or multiple of the angular displacement or rotation of the motor shaft. Furthermore the mechanism may be such that during normal operation the constant speed device causes these contacts to close at regular intervals commensurate with the period of oscillation of the balance wheel. The balance wheel derives its energy intermittently, this energy being transmitted thereto from the motor indirectly in the sense that the required energy is first stored and then transmitted to the balance wheel at a time when the energy storing means is not connected directly to the motor, or at a time when the motor is not supplying any energy to the energy storing means. The operation of the motor serves to store energy in the energy storing means and the same amount of energy is stored regardless of the instantaneous speed of the motor. My improved governor is accordingly of such a nature that regardless of the load on the motor and regardless of fluctuations in the terminal voltage or other variations of the instantaneous speed of the motor, energy impulses of constant magnitude are imparted to the constant speed device at regular intervals. During normal operation the balance wheel will continue to oscillate at its natural speed regardless of changes in the instantaneous speed of the motor and the governor is therefore capable of maintaining the average speed of the motor constant at all times.

The closing of the switch contacts supplies sufficient energy to the motor to tend to cause the motor to accelerate to a speed above the desired predetermined average value, and the action of the balance wheel causes these contacts to be closed at precise regular intervals regardless of the instantaneous speed of the motor. The travel of the motor determines the operation of the means to open the switch contacts and, accordingly, if the motor is driving a heavy load, a relatively long interval of time will elapse between the closing of the switch contacts and the opening of these contacts. On the other hand, if the motor is lightly loaded, a short interval of time elapses between the closing of these contacts and the opening thereof. In other words, if the motor operates under a light load it will accelerate very rapidly after the contacts are closed, and these control contacts will be opened after the lapse of a very brief interval, within this interval the motor travel reaches the point at which the switch contacts are opened by a motor driven element.

Another object of this invention is to provide apparatus of the type described above which is reliably self-starting under all conditions. With this object in view, I prefer to construct and arrange the parts so that the balance wheel lever and the control contacts associated therewith are controlled by forces so nearly counterbalanced when the motor is not operating, that energy stored in the hair spring of the balance wheel is sufficient to initiate movement of the lever from a position of rest as soon as sufficient current is supplied to the motor to start it. Movement of the lever is initiated in this manner if the lever stopped in either of its extreme positions. If this lever comes to rest on dead center, or some other intermediate position, movement of this lever is initiated by the motor instead of by the hair spring.

A further object of my invention is the provision of a governor of the type described above, which is of such a nature that it will control the speed of the motor in the desired manner regardless of the direction of rotation of the motor. Accordingly, my improved governor can be used with a reversible motor and will serve to maintain its average speed constant throughout a wide range of load on the motor, regardless of the direction of rotation of the motor. In general this object of my invention can be attained by providing a reversible driving connection between the motor and the constant speed device which derives its energy from the motor.

Another feature of my invention involves the use of means for holding the balance wheel lever out of contact with the balance wheel mechanism during most of the time when energy impulses are not being imparted to the balance wheel, thus assuring free oscillation of the balance wheel throughout the major portion of its movement.

The various objects and advantages of my invention will be more apparent upon considering the following detailed description of typical embodiments of the invention illustrated in the accompanying drawings, in which:

Fig. 3 is a section view (taken on line 3—3 of Fig. 4) similar to Fig. 1 but showing a modified construction;

Fig. 4 is a section view taken on line 4—4 of Fig. 3;

Fig. 5 is a section view (taken on line 5—5 of Fig. 6) showing another modified form of my invention;

Fig. 6 is a plan view of the governor mechanism illustrated in Fig. 5;

Fig. 7 is a diagrammatic elevation illustrating still another modification of my invention; and Fig. 8 is a diagrammatic view similar to Fig. 7 showing some of the moving parts in a position different from that illustrated in Fig. 7.

Figures 1, 2:
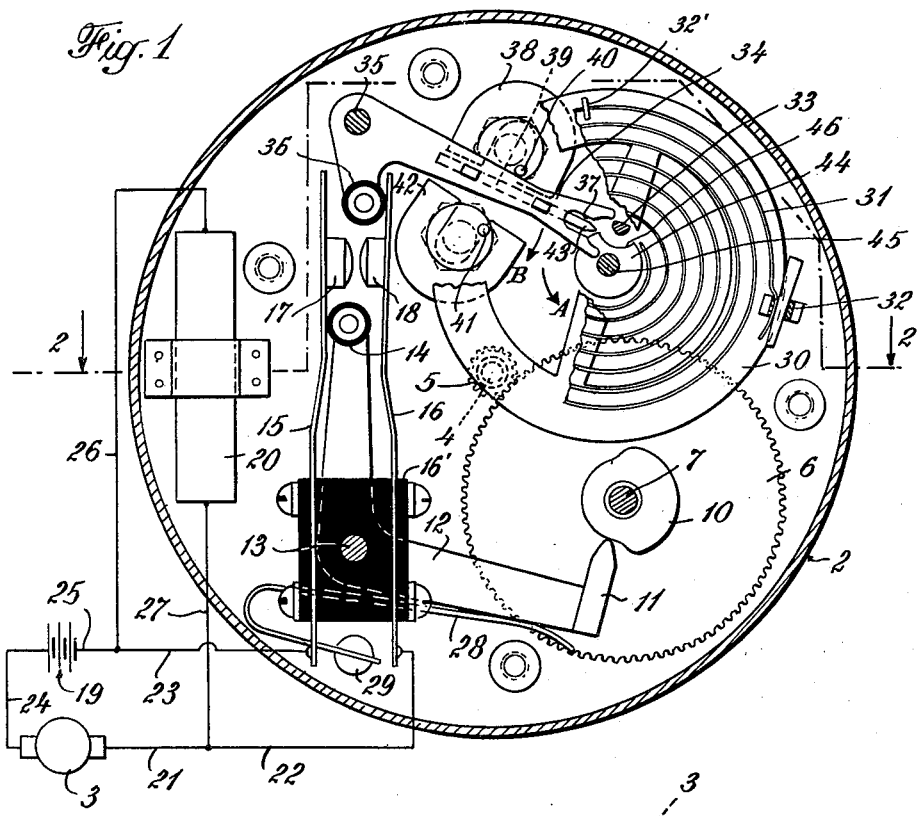
Fig. 1 is a section view (taken on line 1—1 of Fig. 2) of one form of my improved governor mechanism.
Fig. 2 is a section view taken on line 2—2 of Fig. 1, showing the governor mechanism connected to a motor, the speed of which is governed thereby.

In the apparatus shown in Figs. 1 and 2 I have illustrated a motor housing 1 and a governor housing 2. The motor housing 1 encloses a motor 3 which may be any well known type of variable speed motor. The motor shaft 4 carries a pinion 5 located in the governor housing 2 and engaging a gear 6 fixed to a cam shaft 7 mounted in bearing plates 8 and 9. A cam 10 is carried by the shaft 7 and cooperates with a cam follower 11.

The cam follower 11 is carried by a lever 12 pivoted on a shaft 13 supported by the mounting plates 8 and 9. The cam lever 12 carries a post or bead 14 of insulating material, adapted to engage spring supports 15 and 16 carrying switch contacts 17 and 18. The spring elements 15 and 16 are mounted in an insulating block 16'.

In Fig. 1 the motor to be governed is illustrated diagrammatically at 3, this motor being connected to a source of current 19 connected in series with a resistance element 20. A control circuit for the motor includes the circuit wires 21, 22, contact support 16, contacts 18 and 17, contact support 15 and circuit wire 23. The power source 19 is connected to the motor 3 through wires 24, 25, 26, 27 and 21. As illustrated in Fig. 1 the circuit connections for the motor are such that current is supplied to the motor terminals through the resistance element 20 when the contacts 17 and 18 are separated, and, when these contacts are closed, the full voltage of the supply source is impressed on the motor terminals through these switch contacts which then serve to short circuit the resistance element 20. The control circuit including the switch contacts, supplies sufficient current to the motor to tend to cause this motor to accelerate to a speed above the desired predetermined average value, even under the most adverse conditions of minimum voltage and maximum load. The motor never accelerates much beyond this predetermined value, however, because the motor driven cam shaft 17 and the cam mechanism associated therewith actuate the switch contacts to open this control circuit periodically at instants determined by the travel of the motor. Thus the cam 10 has a high portion and a low portion, as best illustrated in Fig. 1, and when the cam 10 rotates to a position such that the cam follower 11 moves from the high portion of the cam to the low portion thereof, the cam lever 12 displaces the spring support 15 to separate the contacts 17 and 18, thereby opening the control circuit including the switch contacts. The cam follower 11 is held in contact with the cam at all times by a spring 28 carried by a fixed support 29. When the control circuit has been opened by the separation of switch contacts 17 and 18 the current then supplied to the motor 3 through the resistance element 20 is only sufficient to cause operation of the motor at a speed below the desired average value even under maximum voltage and minimum load. The resistance element 20 can be omitted if desired, in which event the opening of the control circuit by action of the switch contacts 17 and 18 deenergizes the motor 3 entirely and its speed is reduced more rapidly than is the case where the resistance element is employed as described above.

The reclosing of the control circuit is regulated by a constant speed device which is illustrated in Figs. 1 and 2 as being in the form of a hair spring balance wheel device comprising a balance wheel 30, a hair spring 31 having one end secured to a support 32 and its other end fixed to the balance wheel, a hair spring regulator 32' being provided for adjusting the effective length of this spring. The balance wheel also carries an impulse pin 33 cooperating with a notched lever 34 pivoted at 35. This balance wheel lever carries a post or bead 36 of insulating material adapted to alternately engage the free ends of the spring supports 15 and 16 carrying the switch contacts 17 and 18.

Fig. 1 shows the relative position of the parts at a time just prior to the operation of the balance wheel mechanism to release the contact spring support 16. With the balance wheel 30 moving in the direction indicated by the arrow A in Fig. 1, the impulse pin 33 will enter the notch 37 in the end of the lever 34 and momentarily engage this lever to initiate movement thereof in the direction indicated by the arrow B. This releases the spring support 16 so that the tension in this spring causes the contact 18 to move into engagement with the contact 17, thereby closing the control circuit for the motor 3. It is thus apparent that the control circuit is first opened by action of the cam lever 12 driven by the motor and then closed by action of the spring support 16 initiated by the action of the balance wheel lever 34 as the balance wheel impulse pin engages the notch 37. Thereafter, as the balance wheel reverses its direction of movement, the impulse pin 33 will again enter the notch 37 and move the lever 34 in the opposite direction which permits the spring support 15 to release the energy previously stored therein by action of the cam lever 12, and close the contacts 17 and 18 by moving contact 17 into engagement with the contact 18 which has now been displaced to the position shown in Fig. 1 by the cam lever as the follower 11 engages the raised or high portion of the cam 10.

The balance wheel 30 derives its energy from the motor, the required energy being transmitted to the impulse pin 33 intermittently through the spring supports 15 and 16. These spring supports thus constitute a pair of energy storing elements each of which is energized by the motor and then released to deliver energy to the balance wheel. In Fig. 1 the spring support 16 is shown in its energized position, this support having been moved or displaced to this position by action of the cam lever 12. The spring support 16 is held temporarily in the position shown in Fig. 1 by virtue of its engagement with the post 36 carried by the balance wheel lever 34. The balance wheel lever 34 is temporarily held in the position shown in Fig. 1 by a permanent magnet 38 which attracts a bar or rod 39 of magnetizable material secured to the lever 34. A banking pin 40 provides a stop for the lever 34 and in Fig. 1 the lever 34 is being held against the banking pin 40 by the action of the permanent magnet 38. The pull of the magnet thus counterbalances the tension in the spring support 16 until the impulse pin 33 carried by the balance wheel 30 enters the notch 37 in the end of the lever 34 and engages this lever to displace it in the direction of the arrow B. With the movement of the lever thus initiated by the impulse pin 33, the spring support 16 then forces the balance wheel lever 34 to continue its movement in the direction of the arrow B until the switch contact 18 engages the contact 17, at which time the balance wheel lever 34 is held against a second banking pin 41 by a second permanent magnet 42. This movement of the spring support 16 not only serves to close the switch contacts 17 and 18 but also to deliver an energy impulse to the impulse pin 33 while this pin is in the notch 37 in the balance wheel lever 34. The return movement of the balance wheel produces a corresponding action whereby movement of the balance wheel lever 34 in the opposite direction is initiated by engagement of the impulse pin 33 with this lever, whereupon the spring support 15 then completes this movement of the balance wheel lever to again close the contacts 17 and 18 and to transmit an energy impulse to the impulse pin 33 while it is in the notch 37 in the balance wheel lever 34.

A pin 43, which may be an integral part of the bar 39 of magnetizable material fixed to the lever 34, or a pin otherwise fixed with respect to this lever, extends into close proximity to a balance wheel roller 44 fixed to the balance staff 45 carrying the balance wheel 30. This roller 44 has a cutaway portion 46 which accommodates the movement of the pin 43 as the balance wheel lever 34 oscillates from one extreme position to the other. During normal operation the pin 43 does not touch the roller 44 at any time. When the magnets 38 and 42 hold the lever 34 against the banking pins 40 and 41 the pin 43 is out of engagement with the roller 44. When the lever 34 swings from one extreme position to the other, the pin 43 registers with the cutaway portion 46 of the rotor 44 without touching the roller. The pin and roller, however, prevent accidental displacement of the balance wheel lever 34 which might otherwise occur when the governor mechanism is subjected to vibration or shock. Thus the principal function of the magnets 38 and 42 is to hold the pin 43 out of contact with the roller 44. If these magnets are not employed, and no other means is provided for performing their function, the pin 43 would ride on the surface of the roller 44, the pin being pressed against the roller by the action of the spring elements 15 and 16. This would prevent free movement of the balance wheel and would interfere somewhat with the constant speed operation thereof. While this may not be objectionable for some applications, let I prefer to provide some means for holding the pin 33 out of engagement with the roller 44 during normal operation of the governor.

The apparatus illustrated in Figs. 1 and 2 will maintain the average speed of the motor at a constant predetermined value regardless of the direction of rotation of the motor. The motor driven cam 10 and the follower 11 are of such shape that the cam lever 12 operates in the same manner regardless of the direction of rotation of the cam shaft 7. Thus the connection between the motor and the balance wheel, whereby energy impulses are transmitted to the balance wheel from the motor, may be characterized as a reversible connection, for the cam lever 12 will oscillate in the desired manner regardless of the direction of rotation of the motor driven cam shaft 7.

The apparatus illustrated in Figs. 1 and 2 is reliably self starting. In the event of power failure, the governor mechanism will invariably come to rest with the switch contacts 17 and 18 engaging each other, thus closing the control circuit so that when power is restored to the system the motor begins to operate and drive the cam shaft 7. The mechanism invariably comes to rest with the contacts 17 and 18 engaging each other, because at all times when these contacts are separated, the tension of the hair spring 31 is sufficient to initiate movement of the lever 34 as the impulse pin engages this lever, thereby releasing one or the other of the contact supports to close the contacts. If the mechanism comes to rest with the lever 34 in one or the other of its extreme positions, the impulse pin is then in the notch 37 and a slight force is applied to this pin by the hair spring, this force being counterbalanced by tension in that one of the spring supports 15, 16 which is holding the contacts 17 and 18 in engagement with each other. As soon as the motor starts operating again, the cam lever 12 tends to separate these contacts, and the force applied to the impulse pin 33 by the hair spring is then sufficient to initiate movement of the balance wheel lever 34. If the mechanism comes to rest with the lever 34 in some intermediate position, the first movement of the cam lever 12 driven by the motor as the motor starts operating, releases the pressure exerted by this lever on one of the contact spring supports 15, 16 to permit this spring element to actuate the balance wheel lever 34 and deliver an energy impulse to the impulse pin. Thus the governor mechanism is reliably self-starting at all times, in spite of the fact that the balance wheel mechanism and associated parts are of such a nature that during normal operation of the motor near the desired predetermined average speed the period of oscillation of the balance wheel remains constant regardless of variations in motor load or terminal voltage or other factors affecting the instantaneous speed of the motor.

As explained above, my improved governor preferably includes some means for holding the balance wheel lever out of engagement with the balance wheel mechanism except when the impulse pin carried by the balance wheel engages the balance wheel lever. In the embodiment of my invention illustrated in Figs. 1 and 2, this function is performed by the magnets 38 and 42 which attract the bar of magnetizable material 39 fixed to the balance wheel lever so as to bias this lever toward its extreme positions where it engages either banking pin 40 or banking pin 41. In the embodiment of my invention illustrated in Figs. 3 and 4, this biasing function is performed by a snap spring connected to the balance wheel lever. In the device of Figs. 3 and 4 many of the parts correspond with parts illustrated in Figs. 1 and 2 and in all of these figures corresponding parts are designated by the same reference characters. In the device of Figs. 3 and 4 it will be noted that the permanent magnets have been omitted, and, instead, this device includes a biasing spring 48 having one end connected to the balance wheel lever 34 as shown at 49 and having its other end secured to a mounting post 50 fixed to the casing 2. The biasing spring 48 consists of a strip of resilient metal having a spring element 51 associated therewith. This spring element 51 may be an integral portion of the metal strip, which has been stretched to make it act as a snap spring element. The construction of the biasing spring is such that when the lever 34 to which it is connected is displaced from its central or neutral position, the spring element forces the lever to move until it engages one of the banking pins 40, 41, the lever being in unstable equilibrium except when it is engaging one or the other of these banking pins.

The balance wheel lever 34 of Figs. 3 and 4 carries a contact 52 cooperating with the contacts 17 and 18 carried by the spring supports 15 and 16. The balance wheel staff 53 is cut away at one side as indicated at 54 to permit free movement of the balance wheel lever 34 from one extreme position to the other while the impulse pin 33 registers with the notch 37 in the end of the lever. The balance wheel lever also has curved lateral portions 55 and 56 adapted to embrace the balance staff 53 when the lever 34 occupies one or the other of its extreme positions and this construction prevents the possibility of accidental displacement of the balance wheel lever in the event the governor mechanism is subjected to vibration or shock. During normal operation of the device the lateral portions 55 and 56 of the balance wheel lever are held out of engagement with the balance staff by the action of the biasing spring 48 in holding the lever against the banking pins 40, 41.

The operation of the mechanism illustrated in Figs. 3 and 4 is the same as that of the embodiment of my invention illustrated in Figs. 1 and 2 except that the function performed by the magnets 38 and 42 of Figs. 1 and 2 is performed by the biasing spring element 48 in the device of Figs. 3 and 4. In both of these devices the control circuit for the motor 3 is closed at regular intervals determined by the period of oscillation of the balance wheel, and then opened by the action of the motor driving the cam 10 and the cam lever 12, as the motor operates near its predetermined average speed, and the spring supports 15 and 16 store energy impulses which are then transmitted to the impulse pin of the balance wheel through the balance wheel lever 34.

In Figs. 5 and 6 I have illustrated in diagrammatic form a somewhat simplified embodiment of my invention. In Figs. 5 and 6 the balance wheel lever has a biasing spring incorporated therein, one end of this lever being fixed to a stationary support as hereinafter described. In Figs. 5 and 6 various parts correspond with parts of the apparatus illustrated in Figs. 1 and 2 and such parts bear the same reference numerals. In Figs. 5 and 6, the balance wheel lever 57 cooperates with the balance wheel 30, the impulse pin 33 and the balance staff 53 in the manner described in connection with Figs. 3 and 4. The body portion of the balance wheel lever 57, however, is in the form of a flexible spring member having an integral laterally displaced snap spring element 58, the construction of this portion of the balance wheel lever being similar to the construction of the biasing spring 48 in Fig. 3. One end of the lever 57 is mounted in the fixed insulating support 16' as shown at 59. A cam 60 fixed to the cam shaft 7 driven by the motor 3 through the shaft 4 and the gears 5 and 6, alternately engages the spring supports 15 and 16 to deflect or displace these elements so that they actuate the contacts 17 and 18 to open the motor control circuit at instants determined by the travel of thee motor as described avove. A contact 61 carried by the lever 57 cooperates with the contacts 17 and 18 so that when the contacts 17 and 18 engage the contact 61 the control circuit is closed to short circuit the resistance 20, thus applying sufficient energy to the motor 3 to cause this motor to tend to accelerate to a speed above the desired predetermined average value.

In the device of Figs. 5 and 6, the balance wheel lever 57 is biased toward its extreme positions by the snap spring element 58 forming a part of this lever. The spring tension is sufficient to hold the lever in either of its extreme positions after the cam 60 has separated the switch contacts, until the impulse pin 33 engages the balance wheel lever 57 to initiate movement thereof toward its other extreme position. The energy stored in the displaced spring support, 15 or 16 as the case may be, then continues this movement of the balance wheel lever until it passes its median position, at which time the snap spring element 58 aids in the further movement of the balance wheel lever until the switch contacts 17, 18 and 61 are again in engagement to close the control circuit. This control circuit is thus closed at intervals determined by the period of oscillation of the balance wheel 30 as in the embodiments of my invention illustrated in Figs. 1–4, inclusive. The biasing action of the snap spring 58 tends to hold the balance wheel lever 47 in one of its extreme positions where it tends to hold one or the other of the spring supports 15, 16 in its displaced position, until the impulse pin 33 engages the lever to initiate movement thereof toward its other extreme position. For some applications, satisfactory results can be obtained by having a lever 57 formed of a single strip of flexible material without any snap spring action, in which case the curved portions 55 and 56 at the end of the lever cooperate with the balance staff to hold the lever in its extreme positions until engaged by the impulse pin.

In all of the embodiments of my invention illustrated in Figs. 1–6, inclusive, the energy impulses are transmitted to the balance wheel through a pair of separate spring supports 15 and 16, these spring elements being alternately energized by the motor. It is not necessary, however, to employ such separate energy storing means and in Figs. 7 and 8 I have illustrated an embodiment of my invention employing a single energy storing element that alternately receives energy from the motor during certain periods and then delivers energy impulses to the balance wheel at other times. In Figs. 7 and 8, parts corresponding with parts of the apparatus of Figs. 1 and 2 and in other figures bear the same reference numerals. Thus in Figs. 7 and 8 the balance wheel 30 and associated parts, including the hair spring 31, the impulse pin 33 and the cooperating end of the balance wheel lever 34 having a notch 37 in the end thereof and curved side poritons 55 and 56, may be the same as corresponding parts illustrated in Figs. 3–6, inclusive.

In the embodiment of my invention illustrated in Figs. 7 and 8, the control circuit for the motor 3 includes two sets of contacts, one set being actuated by a cam driven by the motor and the other set being actuated by the combined action of the balance wheel and an energy storing element. Thus in Figs. 7 and 8, the control circuit includes a pair of stationary contacts 62 and 63 associated with a contact 64 carried by a cam lever 65, and this circuit also includes a second pair of adjustable contacts 66 and 67 such as screw threaded contacts carried by stationary binding posts 68 and 69. A contact 70 is carried by the balance wheel lever 34 and cooperates with the adjustable stationary contacts 66 and 67.

An energy storing element in the form of a coil spring 71 has its extremities engaging eyelets of insulating material 72 and 73 mounted in the extremities of the cam lever 65 and the balance wheel lever 34. This coil spring element 71 always has sufficient tension to tend to separate the opposed ends of these two levers 65 and 34. The lever 65 carries a cam follower 74 and this follower is normally held in engagement with the surface of cam 75 by a spring 76'.

The operation of the apparatus illustrated in Figs. 7 and 8 is similar to that of the devices illustrated in the other figures of the drawings. Referring specifically to Figs. 7 and 8 the operation of the motor 3 causes the cam 75, fixed to the motor driven shaft 4 to actuate the cam lever 65 to cause the contact 64 carried thereby to alternately engage the contacts 62 and 63. The contact 62 is connected to the binding posts 69 by a conductor 76 and the contact 63 is connected to the binding post 68 by a conductor 77.

Fig. 7 shows the parts in the position they occupy just after the cam lever 65 has caused the contact 64 carried thereby to be displaced from engagement with contact 63 into engagement with contact 62. The cam lever 65 is pivoted on a support 78 and the balance wheel lever 34 is pivoted on support 79. With the parts in the position shown in Fig. 7 the spring member 71 applies forces to each of the levers 65 and 34 which produce moments about the pivots 78 and 79 that are nearly of the same magnitude, and accordingly as soon as the impulse pin 33 enters the slot 37 in the end of the balance wheel lever 34, and engages the end of the balance wheel lever, it initiates movement thereof toward the position shown in dotted lines in Fig. 7. As soon as this movement has been initiated in this manner the spring element 71 completes this movement and the parts then occupy the position illustrated in Fig. 8. It will be understood that when the parts reach the position shown in Fig. 7 the control circuit for the motor 3 has been broken by the movement of contacts 64 away from contact 63 and into engagement with contact 62. Thus the control circuit for the motor, which was completed through the leads 25, 23, cam lever 65, contact 64, contact 63, conductor 77, binding post 68, contact 66, contact 70, balance wheel lever 34 and conductors 22 and 21, is opened by action of the motor in driving the cam shaft 4 carrying the cam 75. Fig. 8 shows the reclosing of the control circuit completed by the action of the balance wheel 30 and the spring element 71.

It is to be understood that my invention is not limited to the specific illustrative embodiments thereof shown in the accompanying drawings and described in detail but includes various modifications thereof. It will be understood, for example, that while I have illustrated a control circuit for the electric motor comprising a resistance in series with the motor armature and switch contacts for short circuiting this resistance to apply full voltage to the motor whereby it tends to speed up until its speed is above the desired average predetermined value, yet any other well known means for causing a variable speed motor to accelerate in this manner may be employed without departing from the spirit of my invention. As indicated above in the circuit arrangement shown in the accompanying drawings, the resistance element can be omitted entirely if desired, in which event the opening of the control contacts disconnects the motor from the supply circuit. I prefer to employ the resistance, however, for it insures smoother operation. The desired change is, of course, such a reorganization of the circuit or other change which will insure sufficient energy being supplied to the motor to cause the desired acceleration and in using the expression "current" I intend to include any change in the energy supply for the motor, whether this is brought about by releasing a brake, increasing the flow of electric current, changing the excitation for the motor or otherwise.

My invention makes it possible to simplify the construction of variable speed motor governors. In the governors heretofore proposed it has been regarded as essential to use a great many parts including a spring escapement or the like with an escape wheel, verge, etc., but according to my invention it is not necessary to employ any escape wheel or verge and as illustrated in the drawings it is possible to simplify the other parts, depending upon the particular application of the device.

The device of my invention can be relied upon to perform a most accurate timing operation, this reliable operation being the result of timing the supply of energy to the constant speed device so that this energy is stored at certain intervals and then released or transmitted to the constant speed device at other intervals, preferably while the motor is mechanically disconnected from the energy storing means. The accuracy of the device is further improved by having the balance wheel lever mechanically disconnected from the balance wheel at all times except during the brief intervals when the balance wheel is actuating this lever. In this manner free oscillation of the balance wheel is assured so that it is permitted to oscillate at its natural period of oscillation.

As noted above, my improved governor is unique in that it has a reversible driving connection between the motor and the constant speed device so that the governor will perform its function regardless of the direction of operation of the motor. The eccentric driving mechanism between the motor and the energy storing means operates in an identical manner whether the motor is rotating in one direction or the other.

I claim:

1. A governor for a variable speed motor comprising the combination of an electric circuit for supplying sufficient current to the motor to tend to cause the same to operate at a speed above a predetermined value, means comprising a constant speed device for closing said circuit at constant fixed intervals while said device is effectively disconnected from the motor whereby the circuit closing is entirely independent of the instantaneous speed of the motor while the motor operates near said predetermined speed, and means responsive to the operation of the motor at speeds near said predetermined value for opening said circuit between successive closings thereof, at instants determined by the travel of the motor.

2. A governor for a variable speed motor comprising the combination of an electric circuit for supplying sufficient current to the motor to tend to cause the same to operate at a speed above a predetermined value, means comprising a constant speed device for closing said circuit at constant fixed intervals while said device is effectively disconnected from the motor whereby the circuit closing is entirely independent of the instantaneous speed of the motor while the motor operates near said predetermined speed, and means responsive to the operation of the motor at speeds near said predetermined value for driving said constant speed device and for opening said circuit between successive closings thereof, at instants determined by the travel of the motor.

3. A governor for a variable speed motor comprising the combination of an electric circuit for supplying sufficient current to the motor to tend to cause the same to operate at a speed above a predetermined value, a constant speed device, means driven by the motor for supplying sufficient energy to said device to operate the same at all times while the motor is operating, means operated by said motor for periodically opening said circuit at instants determined by the travel of the motor while the motor is operating near said predetermined speed, and means actuated by said device at constant fixed intervals while said device is effectively disconnected from the motor whereby the circuit closing is entirely independent of the instantantaneous speed of the motor while the motor operates near said predetermined speed, for closing said circuit at constant fixed intervals.

4. A governor for a variable speed motor comprising the combination of an electric circuit for supplying sufficient current to the motor to tend to cause the same to operate at a speed above a predetermined value, a constant speed device, energy storing means for intermittently storing energy impulses of constant magnitude independent of the instantaneous speed of the motor, means driven by the motor for intermittently energizing said energy storing means, means actuated by said device for releasing said energy storing means whereby it delivers thereto successive energy impulses of constant magnitude, means operated by said motor for periodically opening said circuit at instants determined by the travel of the motor while the motor is operating near said predetermined speed, and means actuated by said device at constant fixed intervals entirely independent of the instantaneous speed of the motor while the motor operates near said predetermined speed, for closing said circuit at constant fixed intervals.

5. A governor for a variable speed motor comprising the combination of an electric circuit for supplying sufficient current to the motor to tend to cause the same to operate at a speed above a predetermined value, a constant speed device for closing said circuit at constant fixed intervals entirely independent of the instantaneous speed of the motor while the motor operates near said predetermined speed, means responsive to operation of the motor at speeds near said predetermined value for opening said circuit between successive closings thereof at instants determined by the travel of the motor, energy storing means, means driven by the motor for imparting to said energy storing means only during certain periods, energy impulses of constant magnitude independent of the instantaneous speed of the motor and means actuated by said constant speed device for causing said energy storing means to deliver energy thereto only at other periods.

6. A governor for a variable speed motor comprising the combination of an electric circuit for supplying sufficient current to the motor to tend to cause the same to operate at a speed above a predetermined value, a constant speed device for closing said circuit at constant fixed intervals entirely independent of the instantaneous speed of the motor while the motor operates near said predetermined speed, means responsive to operation of the motor at speeds near said predetermined value for opening said circuit between successive closings thereof at instants determined by the travel of the motor, energy storing means, means driven by the motor for periodically engaging said energy storing means to impart energy thereto, and means controlled by said device for holding said energized energy storing means out of engagement with said motor driven means and for subsequently releasing said energy storing means whereby it delivers energy impulses of constant magnitude to said device while out of engagement with said motor driven means.

7. A governor for a variable speed motor comprising the combination of an electric circuit for supplying sufficient current to the motor to tend to cause the same to operate at a speed above a predetermined value, a constant speed device for closing said circuit at constant fixed intervals entirely independent of the instantaneous speed of the motor while the motor operates near said predetermined speed, means responsive to operation of the motor at speeds near said predetermined value for opening said circuit between successive closings thereof at instants determined by the travel of the motor, energy storing means, means driven by the motor for periodically engaging said energy storing means to impart energy thereto, means controlled by said device for holding said energized energy storing means out of engagement with said motor driven mechanism and for subsequently releasing the energy storing means whereby it delivers energy impulses of constant magnitude to said device while out of engagement with said motor driven means and means for preventing mechanical contact between said device and said holding means except when the latter is releasing said energy storing means.

8. A governor for a variable speed motor comprising the combination of an electric circuit for supplying sufficient current to the motor to tend to cause the same to operate at a speed above a predetermined value, a constant speed device, switch contacts in said circuit for opening and closing the same, spring means connected to said contacts, means driven by the motor for intermittently actuating said contacts to simultaneously open said circuit and store in said spring means only during certain periods while the motor operates near said predetermined speed energy impulses of constant magnitude independent of the instantaneous speed of the motor, and means actuated by said constant speed device for thereafter releasing said spring means whereby energy impulses of constant magnitude are delivered thereby to said device and whereby said contacts are actuated to close said circuit at constant fixed intervals.

9. A governor for a variable speed motor comprising the combination of an electric circuit for supplying sufficient current to the motor to tend to cause the same to operate at a speed above a predetermined speed, a constant speed device, switch contacts in said circuit for opening and closing the same, a pair of spring supports each carrying one of said contacts, means driven by the motor for alternately displacing said spring supports to simultaneously open said circuit and store energy in first one of said spring supports and then in the other spring support while the motor operates near said predetermined speed, and means controlled by said constant speed device for temporarily holding each of said spring supports in its displaced position out of contact with said motor driven means and for thereafter releasing the same, whereby energy impulses of constant magnitude are alternately delivered to said device by said spring supports and whereby said contacts are actuated to close said circuit at constant fixed intervals.

10. A governor for a variable speed motor comprising the combination of an electric circuit for supplying sufficient current to the motor to tend to cause the same to operate at a speed above a predetermined speed, a constant speed device, switch contacts in said circuit for opening and closing the same, a pair of spring supports each carrying one of said contacts, means driven by the motor for alternately displacing said spring supports to simultaneously open said circuit and store energy in first one of said spring supports and then in the other spring support while the motor operates near said predetermined speed, and means controlled by said constant speed device for temporarily holding each of said spring supports in its displaced position out of contact with said motor driven means and for thereafter releasing the same, whereby energy impulses of constant magnitude are alternately delivered to said device by said spring supports and whereby said contacts are actuated to close said circuit at constant fixed intervals, the said motor driven means being reversible whereby the motor will operate at a predetermined average speed in either direction.

11. A governor for a reversible variable speed motor comprising the combination of an electric circuit for supplying sufficient current to the motor to tend to cause the same to operate at a speed above a predetermined value, means comprising a constant speed device for closing said circuit at constant fixed intervals entirely independent of the instantaneous speed of the motor while the motor operates near said predetermined speed, and reversible driving means responsive to the operation of the motor at speeds near said predetermined value for driving said constant speed device and for opening said circuit between successive closings thereof, at instants determined by the travel of the motor.

12. A governor for a variable speed motor comprising the combination of an electric circuit for supplying sufficient current to the motor to tend to cause the same to operate at a speed above a predetermined value, a constant speed device, switch contacts in said circuit for opening and closing the same, spring means connected to said contacts, cam actuated means driven by the motor for intermittently actuating said contacts to simultaneously open said circuit and store energy in said spring means only during certain periods while the motor operates near said predetermined speed and means actuated by said constant speed device for thereafter releasing said spring means whereby energy impulses of constant magnitude are delivered thereby to said device and whereby said contacts are actuated to close said circuit at constant fixed intervals.

13. A governor for a variable speed motor comprising the combination of an electric circuit for supplying such current to the motor to tend to cause the same to operate at a speed above a predetermined value, means comprising a constant speed device for closing said circuit at intervals while the motor operates near said predetermined speed, means for transmitting energy to said constant speed device at a constant average rate independent of the instantaneous speed of the motor to maintain constant speed operation of said motor, and means responsive to the operation of the motor at speeds near said predetermined value for opening said circuit between successive closings thereof, at instants determined by the travel of the motor.

14. A governor for a variable speed motor comprising the combination of an electric circuit for supplying such current to the motor to tend to cause the same to operate at a speed above a predetermined value, a pair of switch contacts in said circuit for opening and closing said circuit, a pair of spring supports for said contacts, tending to force said contacts toward each other to close said circuit, means responsive to the operation of the motor at speeds near said predetermined value for alternately displacing the spring supports and the contacts carried thereby, a constant speed device and means controlled by said device for temporarily holding one of said spring supports while the other spring support is being displaced to open said circuit, and for then moving said one support toward the displaced support.

15. A governor for a variable speed motor comprising the combination of an electric circuit for supplying sufficient current to the motor to tend to cause the same to operate at a speed above a predetermined value, a pair of switch contacts in said circuit for opening and closing said circuit, a pair of spring supports for said contacts tending to force said contacts toward each other to close said circuit, cam operated means driven by the motor for alternately displacing first one and then the other of the said spring supports to extreme positions, a balance wheel and a balance wheel lever cooperating with said balance wheel and with said supports to temporarily hold one of said spring supports in its displaced position while the other spring support is displaced by said cam operated means and until the balance wheel actuates said lever to release said one spring support.

16. A governor for a variable speed motor comprising the combination of an electric circuit for supplying sufficient current to the motor to tend to cause the same to operate at a speed above a predetermined value, a pair of switch contacts in said circuit for opening and closing said circuit, a pair of spring supports for said contacts tending to force said contacts toward each other to close said circuit, means driven by the motor for alternately displacing first one and then the other of said spring supports to extreme positions, a balance wheel, a balance wheel lever cooperating with said balance wheel and said supports to temporarily hold one of said spring supports in its displaced position while the other spring support is displaced by said motor driven means and until the balance wheel actuates said lever to release said one spring support, a pair of banking pins for limiting the movement of the lever and means for holding the lever against one or the other of said banking pins and out of contact with the balance wheel except when the balance wheel actuates said lever.

17. A governor for a variable speed motor comprising the combination of an electric circuit for supplying sufficient current to the motor to tend to cause the same to operate at a speed above a predetermined value, a pair of switch contacts in said circuit for opening and closing said circuit, a pair of spring supports for said contacts tending to force said contacts toward each other to close said circuit, means driven by the motor for alternately displacing first one and then the other of said spring supports to extreme positions, a balance wheel, a balance wheel lever cooperating with said balance wheel and said supports to temporarily hold one of said spring supports in its displaced position while the other spring support is displaced by said motor driven means and until the balance wheel actuates said lever to release said one spring support, a pair of banking pins for limiting the movement of the lever, and magnet means for biasing said lever toward extreme positions where it is in engagement with one or the other of said banking pins and out of contact with the balance wheel.

18. A governor for a variable speed motor comprising the combination of an electric circuit for supplying sufficient current to the motor to tend to cause the same to operate at a speed above a predetermined value, a pair of switch contacts in said circuit for opening and closing said circuit, a pair of spring supports for said contacts tending to force said contacts toward each other to close said circuit, means driven by the motor for alternately displacing first one and then the other of said spring supports to extreme positions, a balance wheel, a balance wheel lever cooperating with said balance wheel and said supports to temporarily hold one of said spring supports in its displaced position while the other spring support is displaced by said motor driven means and until the balance wheel actuates said lever to release said one spring support, a pair of banking pins for limiting the movement of the lever, snap spring means for biasing said lever toward extreme positions where it is in engagement with one or the other of said banking pins and out of contact with the balance wheel.

19. A governor for a variable speed motor comprising the combination of an electric circuit for supplying sufficient current to the motor to tend to cause the same to operate at a speed above a predetermined value, a first pair of stationary switch contacts and a movable contact cooperating therewith, means driven by the motor for moving said movable contact from engagement with one of said stationary contacts into engagement with the other stationary contact, a second pair of stationary switch contacts and a pivoted contact cooperating therewith, a constant speed device for regulating movement of said pivoted contact from engagement with one of said second pair of stationary switch contacts into engagement with the other of said pair of switch contacts, and means comprising a spring energy storing element interconnecting said movable contacts for receiving energy impulses from said motor driven means and transmitting the same to said constant speed device, the said several contacts being connected in said electric circuit so that when the motor operates near said predetermined speed, the said motor driven means opens said circuit at instants determined by the travel of the motor and the said constant speed device closes said circuit at regular intervals.

20. A governor for a variable speed motor comprising the combination of an electric circuit for supplying sufficient current to the motor to tend to cause the same to operate at a speed above a predetermined value, a constant speed device for closing said circuit at constant fixed intervals entirely independent of the instantaneous speed of the motor while the motor operates near said predetermined speed, means responsive to operation of the motor at speeds near said predetermined value for opening said circuit at instants determined by the travel of the motor, energy storing means, means driven by the motor for intermittently energizing said energy storing means by applying thereto a force exerted first in one direction and then in another direction, and means actuated by said constant speed device for causing said energy storing means to deliver energy impulses thereto at intervals determined by the operation thereof.

21. A governor according to claim 18 in which the snap spring means constitutes a part of the balance wheel lever.

22. A governor for a variable speed motor comprising the combination of an electric circuit for supplying sufficient current to the motor to tend to cause the same to operate at a speed above a predetermined value, a constant speed device for closing said circuit at intervals independent of the instantaneous speed of the motor while the motor operates near said predetermined speed, the said constant speed device comprising a balance wheel, a balance wheel lever and an impulse pin carried by the balance wheel for engaging said lever, means responsive to operation of the motor at speeds near said predetermined value for opening said circuit at instants determined by the travel of the motor, energy storing means, means driven by the motor for intermittently energizing said energy storing means, means actuated by said constant speed device for causing said energy storing means to deliver energy impulses thereto at intervals determined by the operation thereof and means for holding said balance wheel lever out of contact with said balance wheel except when the impulse pin engages the lever.

23. A governor for a variable speed motor comprising the combination of an electric circuit for supplying sufficient current to the motor to tend to cause the same to operate at a speed above a predetermined value, a constant speed device for closing said circuit at intervals independent of the instantaneous speed of the motor while the motor operates near said predetermined speed, the said constant speed device comprising a balance wheel, a balance wheel lever, and an impulse pin carried by the balance wheel for engaging said lever, means responsive to operation of the motor at speeds near said predetermined value for opening said circuit at instants determined by the travel of the motor, energy storing means, means driven by the motor for intermittently energizing said energy storing means, and means actuated by said constant speed device for causing said energy storing means to engage said lever to deliver energy impulses through said lever to said balance wheel at intervals determined by the operation thereof.

24. A governor for a reversible variable speed motor comprising the combination of an electric circuit for supplying sufficient current to the motor to tend to cause the same to operate at a speed above a predetermined value, a constant speed device for closing said circuit at intervals independent of the instantaneous speed of the motor while the motor operates near said predetermined speed, the said constant speed device comprising a balance wheel, a balance wheel lever and an impulse pin carried by the balance wheel for engaging said lever, means responsive to operation of the motor at speeds near said predetermined value for opening said circuit at instants determined by the travel of the motor, energy storing means, reversible means driven by the motor for intermittently energizing said energy storing means, and means actuated by said constant speed device for causing said energy storing means to engage said lever to deliver energy impulses through said lever to said balance wheel at intervals determined by the operation thereof.

25. A governor for a variable speed motor comprising the combination of an electric circuit for supplying sufficient current to the motor to tend to cause the same to operate at a speed above a predetermined value, a plurality of switch contacts in said circuit for opening and closing said circuit, a pair of spring supports for two of said contacts tending to force said contacts toward each other to close said circuit, cam operated means driven by the motor for alternately displacing first one and then the other of said spring supports to extreme positions, a balance wheel and a balance wheel lever having one end thereof cooperating with the balance wheel and the other end thereof alternately engaging said supports to temporarily hold one of said supports in its displaced position while the other support is displaced by said cam operated means and until the balance wheel actuates said lever to release said one support.

26. A governor for a variable speed motor comprising the combination of an electric circuit for supplying sufficient current to the motor to tend to cause the same to operate at a speed above a predetermined value, a plurality of switch contacts in said circuit for opening and closing said circuit, a pair of spring supports for two of said contacts tending to force said contacts toward each other to close said circuit, means driven by the motor for alternately displacing first one and then the other of said spring supports to extreme positions, a balance wheel, and a lever system having one portion thereof cooperating with the balance wheel and another portion thereof alternately engaging said supports to temporarily hold one of said supports in its displaced position while the other support is displaced by said motor driven means and until the balance wheel actuates said lever system to release said one support.

27. A governor for a variable speed motor comprising the combination of an electric circuit for supplying sufficient current to the motor to tend to cause the same to operate at a speed above a predetermined value, a constant speed device for closing said circuit at constant fixed intervals while the motor operates near said predetermined speed, means responsive to operation of the motor at speeds near said predetermined value for opening said circuit between successive closings thereof at instants determined by the travel of the motor, energy storing means, means driven by the motor for periodically engaging said energy storing means to impart energy thereto, and means controlled by said device for holding said energized energy storing means out of engagement with said motor driven means and for subsequently releasing said energy storing means whereby it delivers energy impulses of constant magnitude to said device while out of engagement with said motor driven means.

ARTHUR W. HAYDON.

REFERENCES CITED

The following references are of record in the file of this patent:

UNITED STATES PATENTS

| Number | Name | Date |
|---|---|---|
| 2,399,574 | Russell | Apr. 30, 1946 |